July 3, 1928.
J. F. O'CONNOR
1,675,660
FRICTION SHOCK ABSORBING MECHANISM
Original Filed Dec. 26, 1925   2 Sheets-Sheet 1
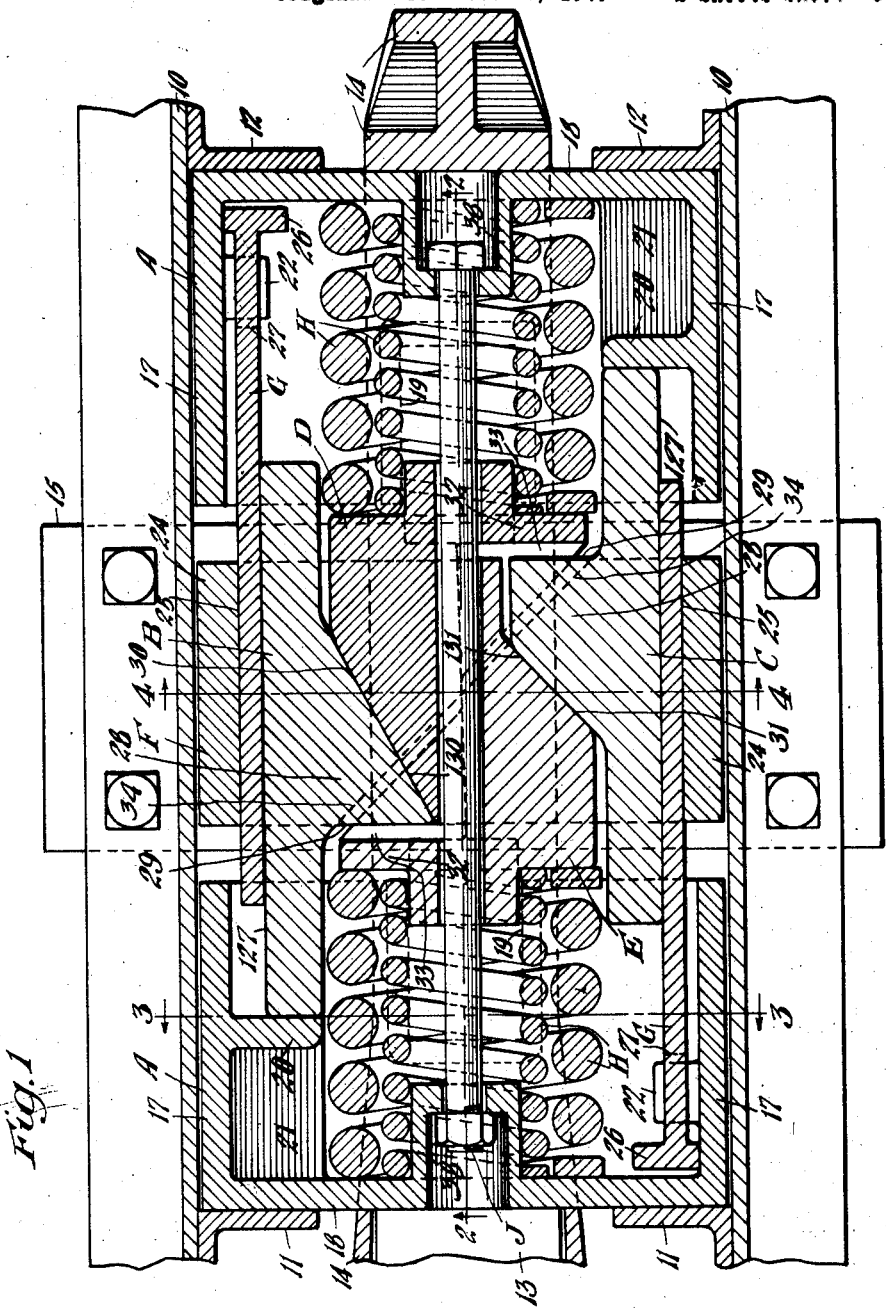
Witness
Wm. Geiger
Inventor
John F. O'Connor
By George I. Haight
His Atty.

July 3, 1928.  
J. F. O'CONNOR  
1,675,660  
FRICTION SHOCK ABSORBING MECHANISM  
Original Filed Dec. 26, 1925 2 Sheets-Sheet 2
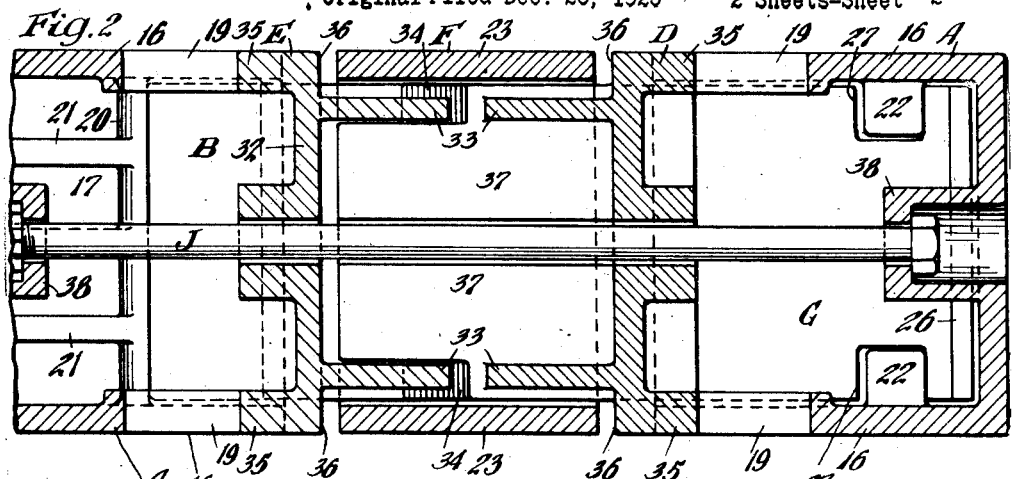
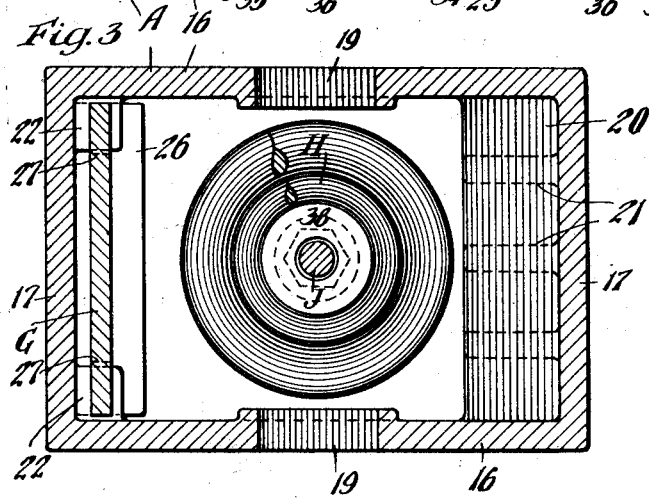
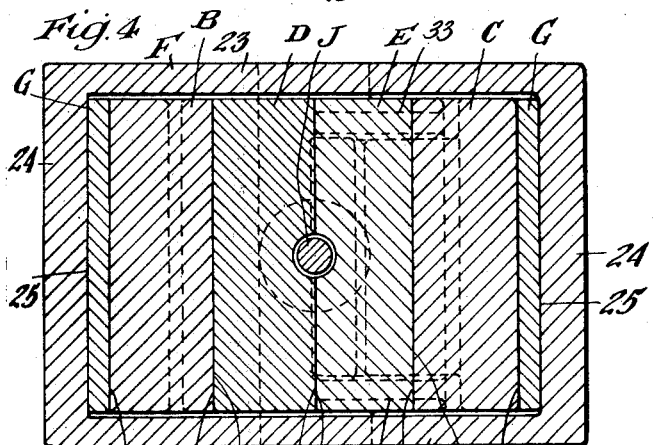
Inventor  
John F. O'Connor Patented July 3, 1928.

1,675,660

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed December 26, 1925, Serial No. 77,788. Renewed February 16, 1928.

This invention relates to improvements in friction shock absorbing mechanisms.

One object of the invention is to provide a friction shock absorbing mechanism, especially adapted for railway draft riggings, having high capacity, together with assured release, employing a friction wedge system including a plurality of elements having cooperating wedging engagement with each other, wherein certain of said elements have co-operating friction surfaces inclined with reference to the direction of the applied force to provide for differential action during the compression stroke of the mechanism, together with a floating friction member co-operating with the friction wedge system.

Another object of the invention is to provide a friction shock absorbing mechanism of the character indicated, comprising a friction system including friction elements and a floating friction shell, wherein the friction shell is separate and distinct from the other elements of the mechanism so that the shell when it becomes worn may be replaced independently of the other parts of the mechanism.

Still another object of the invention is to provide a friction shock absorbing mechanism of the double ended type, including front and rear follower shells, an intermediate friction shell, a spring resistance, a friction system co-operating with the friction shell, comprising friction plates movable with said follower shells relatively to the friction shell and co-operating with friction elements and wedge elements wherein the wedge elements have co-operating surfaces inclined with respect to the longitudinal axis of the mechanism to provide for differential action.

Other objects and advantages of the invention will more fully and clearly appear from the description and claims hereinafter following.

In the drawings, forming a part of this specification, Figure 1 is a horizontal, longitudinal, sectional view of a portion of a railway draft rigging, showing my improvements in connection therewith. Figure 2 is a longitudinal, vertical, sectional view corresponding substantially to the line 2—2 of Figure 1. And Figures 3 and 4 are vertical, transverse, sectional views corresponding respectively to the lines 3—3 and 4—4 of Figure 1.

In said drawings, 10—10 indicate channel-shaped center or draft sills of a railway car underframe, to the inner faces of which are secured front stop lugs 11—11 and rear stop lugs 12—12. The inner end portion of the drawbar is designated by 13, to which is operatively connected a yoke 14 of well-known form. The shock absorbing mechanism proper is disposed within the yoke and the yoke in turn is supported in operative position by a detachable saddle plate 15 fixed to the draft sills.

The improved shock absorbing mechanism proper, as shown, comprises, broadly, front and rear follower casings A—A; two friction shoes B and C; two wedge blocks D and E; a friction shell F; two friction plates G—G; front and rear spring resistance elements H—H; and a retainer bolt J.

The follower casings A, which are of like design, each have horizontally disposed, spaced, top and bottom walls 16—16, longitudinally disposed, spaced side walls 17—17 and a transverse end wall 18. The end wall 18 co-operates with the stop lugs in the manner of the usual follower. As most clearly shown in Figures 1 and 2, the top and bottom walls 16 of each casing A are centrally cut away as indicated at 19—19 for a purpose hereinafter described. One of the side walls 17 of each casing is provided with an inwardly extending flange 20 reinforced by longitudinally extending webs 21—21. The opposite side wall 17 of each casing is provided with a pair of inwardly projecting lugs 22—22 adapted to co-operate with one of the plates G in a manner hereinafter more fully described.

The friction shell F is also in the form of a rectangular box-like casing having horizontally disposed top and bottom walls 23—23 and vertically disposed spaced side walls 24—24. The side walls 24 present interior, longitudinally extending friction surfaces 25 adapted to co-operate with the friction plates G. As most clearly shown in Figures 1 and 2, the friction shell F is open at its opposite ends and is normally spaced from the front and rear follower casings, being centrally disposed therebetween.

The friction plates G—G, which are two in number, are of identical construction. One of the plates G is disposed at each side of the mechanism and is adapted to co-operate with the corresponding friction surface of the friction shell F. Each friction plate G is of substantially rectangular outline and has a pair of laterally projecting flanges 26—26 at the outer ends thereof. At the end adjacent the flanges 26, the plate G has the top and bottom edges thereof notched as indicated at 27, the notches 27 of each plate being adapted to receive the corresponding set of lugs 22 of one of the casings A. The notches 27, as most clearly shown in Figure 2, are of greater length longitudinally of the mechanism than the lugs 22, thereby permitting a certain amount of play between the lugs and plates. The two plates G are disposed on opposite sides of the mechanism and are reversely arranged, that is, one of the plates has the end thereof carrying the flanges 26 disposed at the front end of the mechanism, while the other plate has the corresponding end disposed at the rear of the mechanism. The end of each plate provided with the flanges 26 is adapted to co-operate with the end wall of the corresponding casing A and is slightly spaced from said wall as most clearly shown in Figures 1 and 2, to provide for a certain amount of preliminary movement of the follower casings before the friction plates are engaged by the casings. In this connection, it is pointed out that the amount of play between the lugs 22 and the plates is sufficient to permit of this preliminary movement.

The friction shoes B and C, which are two in number, are disposed at opposite sides of the mechanism. The shoes B and C are of substantially the same design, except as hereinafter pointed out, each shoe having a longitudinally disposed outer flat friction surface 127 adapted to co-operate with the inner friction surface of the corresponding friction plate G. On the inner side, each shoe is provided with a lateral enlargement 28 having a flat transverse end face 29 and an inner wedge face. The wedge face of the shoe B is indicated by 30, while the wedge face of the shoe C is indicated by 31. The wedge face 30 is preferably disposed at a relatively keen wedge acting angle with reference to the longitudinal axis of the mechanism, while the wedge face 31 of the shoe C is disposed at a relatively blunt releasing angle with reference to said axis. The front end of the wedge friction shoe B bears directly on the flange 20 of the front follower casing A, while the rear end of the shoe C bears on the flange 20 of the rear follower casing A.

The wedge blocks D and E are of substantially the same design, except as hereinafter pointed out. Each wedge block has a lateral flange 32 formed integral therewith, the flange 32 acting in the manner of a spring follower co-operating with one of the main spring resistance elements H. As most clearly shown in Figures 1 and 2, each wedge block is provided with top and bottom webs 33 adapted to reinforce the flanges 32. In order to accommodate the webs 33, the friction shoes B and C are cut away at the top and bottom sides as indicated at 34—34. As most clearly shown in Figure 2, the flanges 32 of the wedge blocks D and E are extended respectively above and below the top and bottom sides of the blocks as indicated at 35. The extensions 35 are accommodated for sliding movement within the openings 19 of the corresponding follower casings A, the openings 19 being of such a length as to permit full compression of the mechanism. At the inner sides, the extensions 35 present shoulders 36 adapted to co-operate with the corresponding ends of the friction shell F to bring the latter to approximately centered position when the mechanism is released. Each of the wedge blocks D and E is also provided with an outer wedge face, the wedge face of the block D being designated by 130 and the wedge face of the block E being designated by 131. The wedge face 130 of the block D is adapted to co-operate with the wedge face 30 of the shoe B and is correspondingly inclined thereto, while the wedge face 131 of the block E is correspondingly inclined to the wedge face 31 of the shoe C and is adapted to co-operate therewith. On the inner side, each wedge block has a longitudinally disposed friction surface 37 slightly inclined with reference to the longitudinal axis of the mechanism. The friction surfaces 37 of the blocks D and E interengage as most clearly shown in Figure 1. It will be evident that upon relative movement of the blocks D and E longitudinally of the mechanism, the same will be forced apart laterally, due to the inclination of the co-operating friction surfaces 37, thereby effecting a differential action of he mechanism.

The spring resistance elements H are two in number, one element being disposed at the front end of the mechanism and the other at the rear end thereof. Each spring resistance element comprises a relatively heavy outer coil and a lighter inner coil, the coils of each element having their opposite ends bearing respectively on the end wall 18 of one of the follower casings A, and the outer end of the corresponding wedge block. In order to maintain each spring resistance element properly centered, the end wall of each casing A is provided with a hollow boss 38 projecting inwardly therefrom and extending into the corresponding end of the inner coil of said spring element.

The opposite end of the spring element is centered by a similar boss extending outwardly from the corresponding wedge block.

The mechanism is held of uniform overall length and in assembled relation by the retainer bolt J, which has its opposite ends anchored to the hollow lugs 38 of the front and rear follower casings A. The shank of the bolt extends through aligned openings in the flanges 32 of the wedge blocks, and the inner faces of the blocks are longitudinally recessed as most clearly shown in Figure 1 to accommodate the sides of the shank of the bolt. The openings and recesses in the blocks are of such a size as to allow sufficient play to permit of the proper lateral movement of the blocks during the differential action of the mechanism. The retainer bolt in addition to holding the mechanism assembled, also serves to maintain the parts under a predetermined initial compression and may be adjusted to bring the mechanism to proper overall length. Compensation for wear of the various friction and wedge faces is had by the expansion of the spring resistance elements H, which as pointed out are under initial compression, sufficient clearance being left between the outer ends of the enlargements of the friction shoes and the flanges 32 of the wedge blocks to permit the necessary relative movement of these parts.

The operation of my improved shock absorbing mechanism, assuming a compression stroke, is as follows: The front and rear casings A will be moved relatively toward each other, compressing the main spring resistance elements H and forcing the shoe B rearwardly with reference to the shoe C. A wedging action will thus be set up between the shoes B and C and the wedge blocks D and E. Due to this wedging action, the plates G will be forced into tight frictional engagement with the walls of the friction shell F. During the preliminary compression of the mechanism, there will be substantially no movement of the friction plates with the casings A, due to the clearance left between these parts. During the continued compression of the mechanism, the end walls 18 of the casings A will engage the outer ends of the friction plates G, causing the latter to be moved in unison with the casings and effecting relative movement of these plates with reference to the friction shell F. During the action last described, the frictional resistance will be greatly augmented, due to this relative movement of the plates and friction shell. It will be evident that the shoes B and C will also be forced to slide relatively to the plates, inasmuch as each of the shoes is moved with one of the casings while the plate with which the shoe co-operates is carried by the other casing. During the compression of the mechanism, the wedge blocks D and E will be forced to move relatively to each other with the shoes B and C, thereby further compressing the main spring resistance elements. During the relative movement of the wedge blocks D and E, the same will be forced apart laterally as hereinbefore pointed out, due to the inclination of the co-acting friction surfaces 37 thereof, thereby effecting a differential action and effecting a still further compression of the main spring resistance elements. The described action will continue either until the actuating force is reduced or the inner ends of the front and rear follower casings come into abutment with the opposite ends of the friction shell F, whereupon the actuating force will be transmitted directly through the follower casings and friction shell to the stop lugs of the draft sills, relieving the main springs from excessive pressure. When the actuating force is reduced, the springs F will effect return of the wedge blocks D and E to normal position, and also force the casings A outwardly. The approximate centering of the friction shell will be effected by the flanges 32 on the wedge blocks D and E as hereinbefore pointed out. During compression of the mechanism, due to the clearance left between the outer ends of the friction plates and the end walls of the casings A, the lugs 22 of the casing will be carried inwardly with reference to the plates G during preliminary action, thereby providing a clearance between the outer faces of the lugs and the corresponding end walls of the notches in the plates G. Due to this clearance, the initial release action of the wedge system will take place before there is any movement of the friction plates, thereby reducing the pressure on the plates and greatly facilitating release. After the clearance between the lugs and the plates has been taken up, the lugs will carry the plates outwardly with the casings A, restoring the same to the normal position shown in Figure 1. Due to the relatively blunt cooperating faces of the wedge block E, and the shoe C, the wedge blocks will be squeezed out from between the shoes during release of the mechanism, thereby relieving the pressure on the co-operating keen wedge faces and greatly facilitating the releasing operation.

In addition to facilitating release of the mechanism, the blunt and keen angle arrangement of co-acting wedge faces also effectively prevents sticking of the elements of the wedge system during compression of the mechanism.

It will be evident that my invention is not limited to the arrangement of blunt and keen wedge faces hereinbefore described, but that it is within the scope of the invention to so arrange the wedge faces that all of the same will be disposed at the same angle with reference to the longitudinal axis of the mechanism.

While I have herein shown and described what I now consider to be the preferred manner of carrying out my invention, the same is merely illustrative, and I contemplate all changes and modifications that come within the scope of the claims appended hereto.

I claim:

1. In a friction shock absorbing mechanism, the combination with front and rear follower elements relatively movable toward and away from each other; of a floating friction member interposed between said follower elements; a friction wedge system co-operating with said member, including a plurality of friction elements and wedge elements co-operating with the friction elements, said wedge elements having co-operating friction surfaces disposed longitudinally of the mechanism; and spring resistance means interposed between said follower elements and friction system.

2. In a friction shock absorbing mechanism, the combination with followers relatively movable toward and away from each other; of a floating friction member interposed between said followers; a friction wedge system co-operating with said member, including a plurality of relatively movable friction shoes and wedge members co-operating with said shoes, said wedge members having co-operating friction surfaces inclined to the longitudinal axis of the mechanism; co-operating means on said followers and shoes for effecting relative movement of the latter upon approach of said followers; and spring resistance means interposed between said system and followers.

3. In a friction shock absorbing mechanism, the combination with front and rear follower shells movable relatively toward and away from each other; of a friction shell interposed between said follower shells; a friction wedge system co-operating with said friction shell, said system including friction shoes and wedge elements, said shoes and wedge elements having co-operating wedge faces, said wedge elements having co-operating friction surfaces inclined with respect to the longitudinal axis of the mechanism; co-operating means on said follower shells and shoes for effecting relative movement of the latter; and spring resistance elements opposing relative movement of said follower shells and wedge elements.

4. In a friction shock absorbing mechanism, the combination with front and rear follower members relatively movable toward and away from each other; of a floating friction shell interposed between said follower members; a friction wedge system co-operating with the friction shell, said system including a set of friction elements movable with one of said follower members, and a second set of friction elements movable with the other follower, the friction elements of each set having co-operating wedge faces, and certain elements of said two sets having co-operating friction surfaces inclined with respect to the longitudinal axis of the mechanism; means on said follower members for effecting movement of one of said sets of elements with reference to the other; and spring resistance elements interposed between said friction wedge system and the front and rear follower members.

5. In a friction shock absorbing mechanism, the combination with front and rear followers relatively movable toward and away from each other; of a friction shell interposed between said followers; a friction wedge system co-operating with the shell, said system including a plurality of friction shoe members and co-operating wedge members, certain of said members having co-operating wedge faces disposed at a relatively keen wedge acting angle with respect to the longitudinal axis of the mechanism and others of said members having co-operating faces disposed at relatively blunt angles with respect to said longitudinal axis, said wedge members having inter-engaging friction surfaces inclined with respect to the longitudinal axis of the mechanism; means on said front and rear followers for effecting relative movement of said shoe members; and spring resistance elements interposed between said followers and wedge members.

6. In a friction shock absorbing mechanism, the combination with front and rear followers relatively movable toward and away from each other; of a friction shell interposed between said followers; a friction wedge system co-operating with the shell, said system including a plurality of friction shoes and co-operating wedge members, said wedge members having inter-engaging friction surfaces; means on said wedge members for engaging and restoring the shell to normal position after each compression stroke; and spring resistance elements interposed between said wedge members and followers.

7. In a friction shock absorbing mechanism, the combination with front and rear followers relatively movable toward and away from each other; of a friction shell interposed between said followers; friction plates co-operating with the shell and adapted to be engaged by said followers and moved relatively to the shell upon relative approach of said followers; wedge friction shoes co-operating with said plates; wedge members co-operating with said shoes; means on said followers for effecting relative movement of said shoes; and spring means resisting relative movement of said followers and wedge members.

8. In a friction shock absorbing mechanism, the combination with front and rear followers relatively movable toward and away from each other; of a friction shell interposed between said followers; a friction plate movable with each follower and co-operating with said shell; a wedge friction shoe movable with each follower, the shoe movable with each follower co-operating with the friction plate movable with the other follower; a wedge co-operating with each shoe, said wedges having co-operating friction surfaces inclined with respect to the longitudinal axis of the mechanism; and means yieldingly opposing relative movement of said wedges and followers.

9. In a friction shock absorbing mechanism, the combination with front and rear followers relatively movable toward and away from each other; of a friction shell interposed between said followers; friction plates co-operating with the shell, each plate having one end thereof normally spaced from one of said followers to provide for preliminary action of the mechanism, said ends of said plates being engaged by said followers after said preliminary action to effect movement of said plates with reference to the friction shell; wedge shoes co-operating with said plates; wedge members co-operating with the shoes; means on said followers for effecting relative movement of said shoes; and spring means resisting relative movement of said followers and wedge members.

In witness that I claim the foregoing I have hereunto subscribed my name this 21st day of December 1925.

JOHN F. O'CONNOR.